US011442020B2

(12) United States Patent
Lang et al.

(10) Patent No.: US 11,442,020 B2
(45) Date of Patent: Sep. 13, 2022

(54) ON-AXIS AND DIFFUSE ILLUMINATION FOR INSPECTION SYSTEMS

(71) Applicant: Hutchinson Technology Incorporated, Hutchinson, MN (US)

(72) Inventors: Matthew S. Lang, Excelsior, MN (US); Timothy J. Maday, Hutchinson, MN (US); Dennis R. Johnson, Hamburg, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 15/727,215

(22) Filed: Oct. 6, 2017

(65) Prior Publication Data

US 2018/0100808 A1 Apr. 12, 2018

Related U.S. Application Data

(60) Provisional application No. 62/405,549, filed on Oct. 7, 2016.

(51) Int. Cl.
*G01N 21/88* (2006.01)
*G02B 19/00* (2006.01)
(Continued)

(52) U.S. Cl.
CPC ....... *G01N 21/8806* (2013.01); *G02B 7/1815* (2013.01); *G02B 19/0028* (2013.01); *G02B 19/0066* (2013.01); *G02B 27/0994* (2013.01); *H04N 5/2256* (2013.01); *G01N 2021/8816* (2013.01); *G01N 2201/062* (2013.01); *G01N 2201/065* (2013.01)

(58) Field of Classification Search
CPC ......... G01N 21/8806; G01N 2201/065; G01N 2201/062; G01N 2021/8816; G02B 27/0994; G02B 19/0066; G02B 19/0028; G02B 7/1815; H04N 5/2256
USPC ........................................................ 348/143
See application file for complete search history.

(56) References Cited

U.S. PATENT DOCUMENTS 5,684,530 A * 11/1997 White .................. H04N 1/0289
348/131
5,764,874 A 6/1998 White
(Continued)

FOREIGN PATENT DOCUMENTS

CA          1099682 A      4/1981
CN       201348611 Y     11/2009
(Continued)

OTHER PUBLICATIONS

International Search Report and Written Opinion in International Application No. PCT/US2017/055647, dated Jan. 2, 2018.
(Continued)

*Primary Examiner* — Richard T Torrente
(74) *Attorney, Agent, or Firm* — DLA Piper LLP (US)

(57) ABSTRACT

An inspection system is described. The inspection system includes a camera and a housing. The housing contains a reflective dome. The reflective dome includes an apex and a viewport. The viewport is offset from the apex. The camera is mounted to capture light exiting the reflective dome through the viewport. And, a plurality of light sources are arranged about the reflective dome such that light output from the plurality of light sources enters the dome.

20 Claims, 9 Drawing Sheets

(51) Int. Cl.
  *G02B 27/09* (2006.01)
  *G02B 7/18* (2021.01)
  *H04N 5/225* (2006.01)

(56) References Cited

U.S. PATENT DOCUMENTS

| | | | |
|---|---|---|---|
| 6,449,103 B1 * | 9/2002 | Charles | G02B 13/06 |
| | | | 359/366 |
| 6,577,397 B1 | 6/2003 | Wadman | |
| 9,157,867 B2 * | 10/2015 | Chatterjee | G01N 21/9501 |
| 2007/0188722 A1 | 8/2007 | Stober | |
| 2007/0273890 A1 | 11/2007 | Njo | |
| 2007/0291361 A1 | 12/2007 | Lee | |
| 2010/0231143 A1 | 9/2010 | May et al. | |
| 2012/0121245 A1 * | 5/2012 | Messina | G02B 19/0028 |
| | | | 396/199 |
| 2012/0206050 A1 * | 8/2012 | Spero | H05B 47/11 |
| | | | 315/152 |
| 2020/0182801 A1 * | 6/2020 | Fang | G01N 21/8806 |

FOREIGN PATENT DOCUMENTS

| | | |
|---|---|---|
| CN | 102356457 A | 2/2012 |
| CN | 203297986 U | 11/2013 |
| CN | 204629260 U | 9/2015 |
| CN | 105847640 A | 8/2016 |
| JP | 8-510053 A | 10/1996 |
| JP | 10-221271 A | 8/1998 |
| JP | 11-296657 A | 10/1999 |
| JP | 2006-17689 A | 1/2006 |
| JP | 2008-523404 A | 7/2008 |
| JP | 2011-69651 A | 4/2011 |
| JP | 2014-190868 A | 10/2014 |
| KR | 10-1474191 B1 | 12/2014 |

OTHER PUBLICATIONS

Office Action in Chinese Patent Application No. 201780061811.4, dated Jun. 3, 2021.
Notice of Reasons for Refusal in Japanese Application No. 2019-518377, dated Aug. 24, 2021.
Office Action in Chinese Patent Application No. 201780061811.4, dated Feb. 11, 2022.

* cited by examiner

ON-AXIS AND DIFFUSE ILLUMINATION FOR INSPECTION SYSTEMS

CROSS-REFERENCE TO RELATED APPLICATIONS

This application claims priority from U.S. Provisional Patent Application No. 62/405,549, filed on Oct. 7, 2016, which is hereby incorporated by reference in its entirety.

FIELD

Embodiments of the invention relate generally to inspection systems. In particular, embodiments of the invention relate to an illumination for inspection systems.

BACKGROUND

Camera-based inspection systems have been used to automate inspection, or enhance manual inspection, of small and/or numerous manufactured parts. For example, a camera-based inspection system can identify nonconformities such as manufacturing errors or contamination at a faster rate and/or for very small parts than a human could achieve without such a system. Such systems require sufficient resolution to identify nonconformities in the inspected parts. Several factors influence the resolution at what the camera-based inspection system can operate. Such factors include the quality of the camera, the nature of the parts being inspected, and the illumination of the parts. In some applications, the illumination of the parts is essential. There remains a continuing need for enhanced camera-based inspection systems.

SUMMARY

An inspection system is described. The inspection system includes a camera and a housing. The housing contains a reflective dome. The reflective dome includes an apex and a viewport. The viewport is offset from the apex. The camera is mounted to capture light exiting the reflective dome through the viewport. And, a plurality of light sources are arranged about the reflective dome such that light output from the plurality of light sources enters the dome.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements.

DETAILED DESCRIPTION

Figure 1:
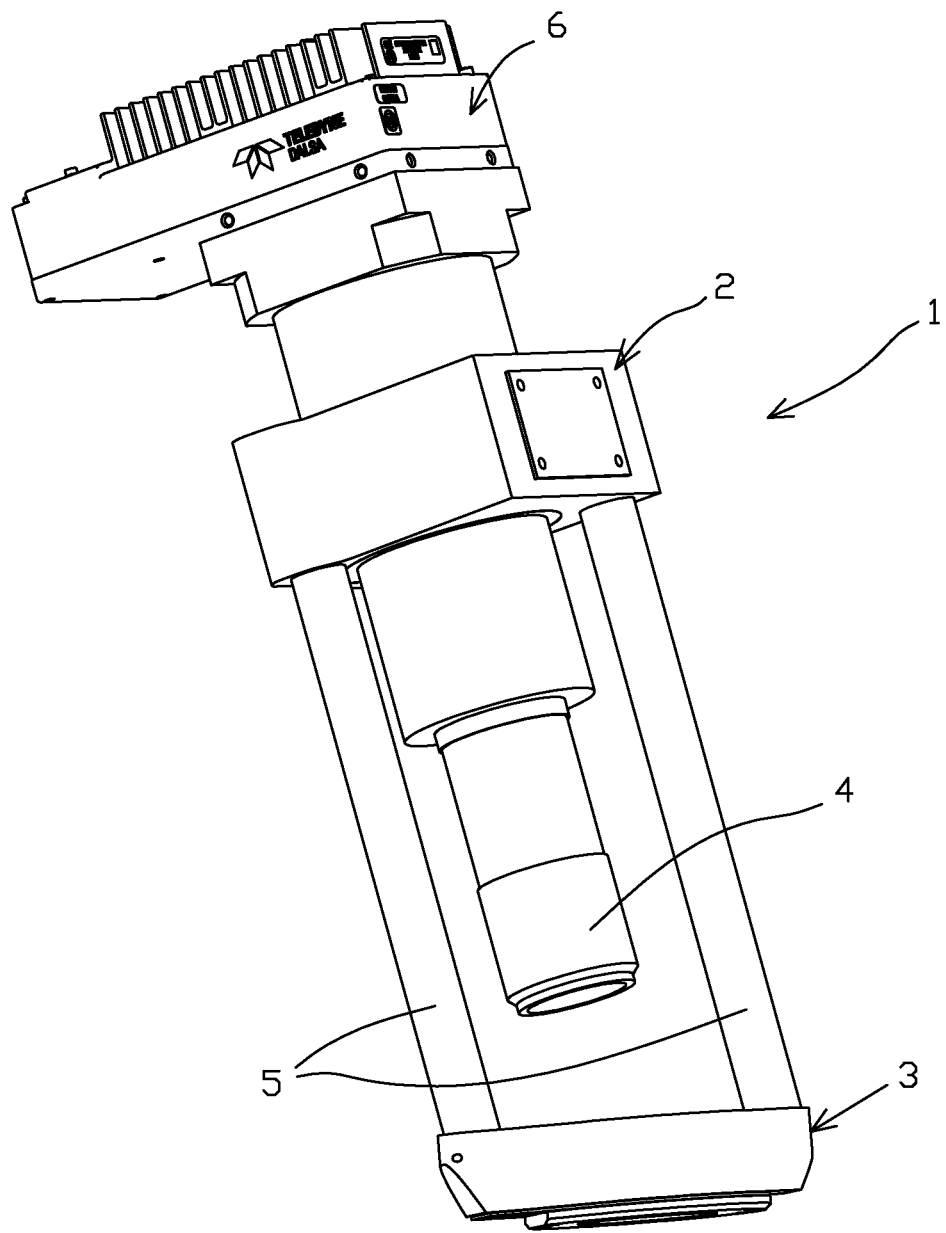
FIG. 1 is a perspective view of an inspection system according to an embodiment.

Aspects of illuminating parts in connection with camera-based inspection systems are further presented herein. Camera-based inspection systems can illuminate inspected parts with two types of illumination. The first type illumination is on-axis illumination. The light used in on-axis illumination is typically a single, narrow, and intense beam of light. The pathway of the beam can reflect off of the part being inspected and then directly into the camera. In some applications, essentially all photons of the beam are traveling along parallel paths. Because of the directional uniformity of the beam, on-axis illumination can leave shadows when reflected off of a surface having an irregular profile (e.g., containing bumps, edges, divots, folds, creases, etc.). On-axis illumination is particularly useful for assessing slope or structure characteristics of the surface.

The second type of illumination is diffuse illumination where light is generated from many directions or angles. Diffuse illumination that is supplied by a source close to a hemisphere in angular subtense ($2\pi$ steradians) is also known as "cloudy day" illumination. The light used in diffuse illumination follows many different, and often unpredictable, pathways. As compared to on-axis illumination, diffuse illumination may be less intense per unit area. Therefore, diffuse illumination may be less effective in applications requiring high fluence. Due to the varied orientations of light in diffuse illumination, diffuse illumination can eliminate many if not all shadows caused by surface structure. While diffuse illumination has a lot of advantages when looking at curved surfaces, diffuse illumination may leave a blind spot along the axis of the camera.

A combination of on-axis illumination and diffuse illumination can provide several advantages, and mitigate the drawbacks, of each type illumination. However, adapting the system to provide both types of illumination can pose some challenges. For example, providing both on-axis and diffuse illumination for small camera systems may generate excessive heat and may not accommodate conventional configurations.

One type of system that combines on-axis and diffuse illumination employs a reflective dome into which diffuse light is directed. The part being inspected is placed below the reflective dome. A hole is provided at the apex of the dome, opposite the part being inspected. The diffuse light shines off of the reflective dome, off of the part, through the hole and to a camera which is placed above the reflective dome in line with the hole. A beam of light is generated above the reflective dome and is directed through the hole where it reflects off of the part being inspected at an angle orthogonal to the orientation of the part such that the beam of light reflects directly back up into the hole and to the camera. The pathway of such a beam of light requires that a beam splitter be used to allow the beam to pass in different directions through the same hole. However, use of the beam splitter necessarily causes a substantial loss of otherwise useful light, for which more light must be generated to compensate.

The present disclosure is directed to illumination systems that provide or approximates both on-axis and diffuse illumination for a camera-based inspection system while minimizing or eliminating the complications discussed above.

FIG. 1 shows an inspection system 1 according to an embodiment. The inspection system 1 includes a camera mounting structure 2 and an illumination housing 3. A pair of tubes 5 connect the camera mounting structure 2 to the illumination housing 3. More specifically, the illumination housing 3 is suspended below the camera mounting structure 2 by the pair of tubes 5. The pair of tubes 5 can be formed from metal, for example. The camera mounting structure 2 is mounted to a camera assembly 6. The camera assembly 6 can include a camera and any circuitry necessary for taking, processing, and/or analyzing images to identify nonconformities in parts (e.g., a processor and memory storing program instructions thereon that are executable by the processor for performing any function referenced herein and/or known for taking, processing, and analyzing images to identify nonconformities in parts). The camera assembly 6 includes a lens 4 (not illustrated in detail). The lens 4 is positioned above the illumination housing 3 for receiving reflected light that passes through the illumination housing 3.

Figure 2:
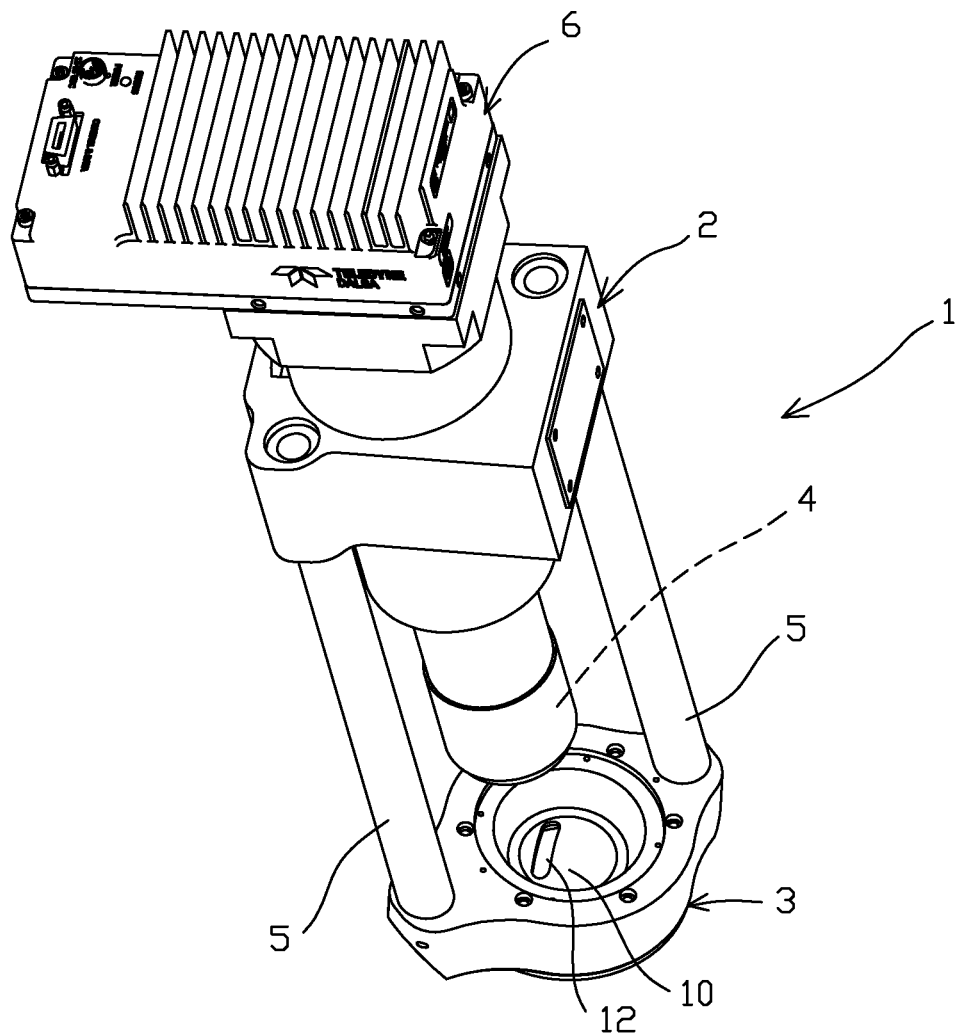
FIG. 2 is another perspective view of the inspection system according to an embodiment.

FIG. 2 shows the inspection system of FIG. 1 from an overhead view. In the view of FIG. 2, a reflective dome 10 can be seen within the illumination housing 3. The reflective dome 10 includes a viewport 12.

Figure 3:
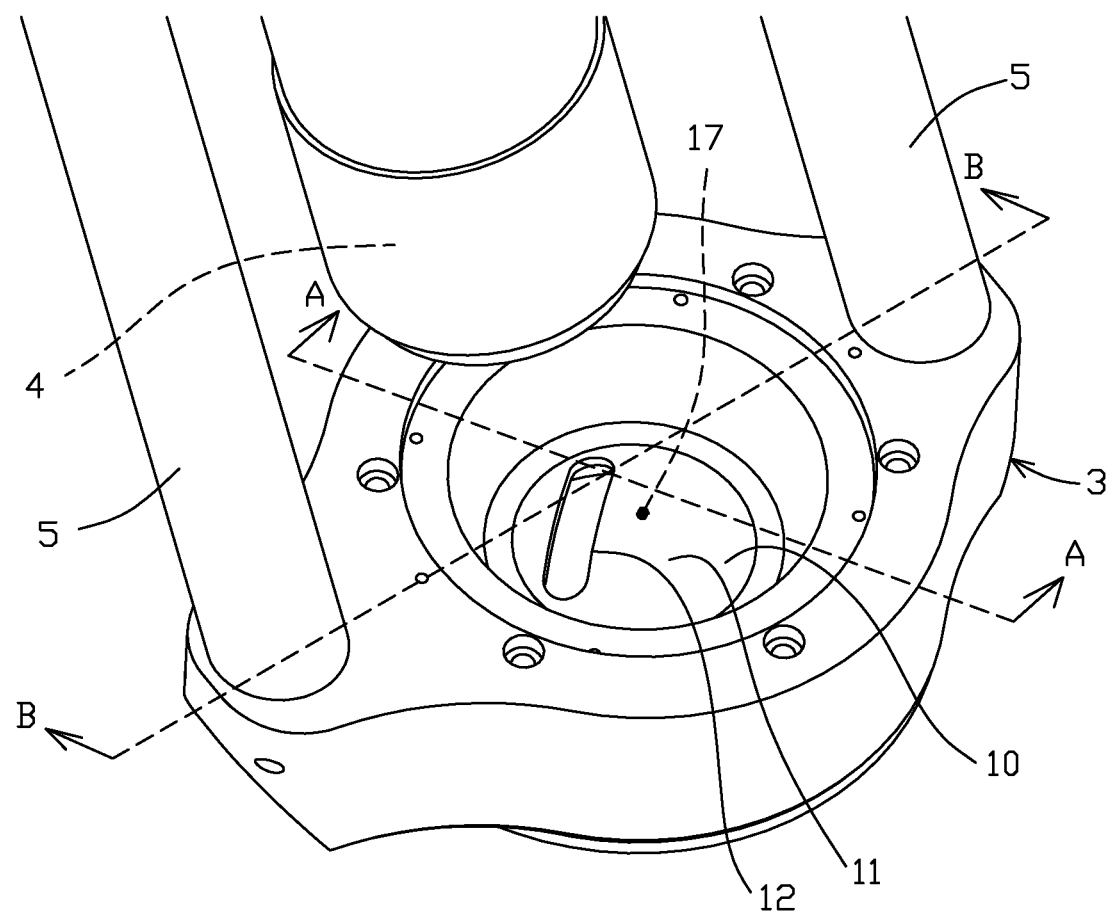
FIG. 3 is a detailed perspective view of an illumination housing of the inspection system according to an embodiment.

FIG. 3 shows a detailed view of the illumination housing 3 according to an embodiment. The view of FIG. 3 shows that the reflective dome 10 includes a top side 11. The top side 11 of the reflective dome 10 is hemispherical and a convex shape. As can be seen in the view of FIG. 3, the viewport 12 is elongated. For example, the viewport 12 can be an especially elongated oval or a rectangle with rounded ends. The viewport 12 is elongated to capture the bundle of rays that connect the line field of view, itself elongated, to the circular entrance pupil of the lens 4. This shape minimizes the area of the viewport 12, thereby maximizing the reflective surface within the dome, while not blocking (vignetting) rays connecting the field of view and the lens 4. An apex 17 of the reflective dome 10 is indicated in FIG. 3. As can be seen, the viewport 12 is offset from the apex 17 of the reflective dome 10. It is through the viewport 12 that light reflected within and below the illumination housing 3 travels to the lens 4.

Figure 4:
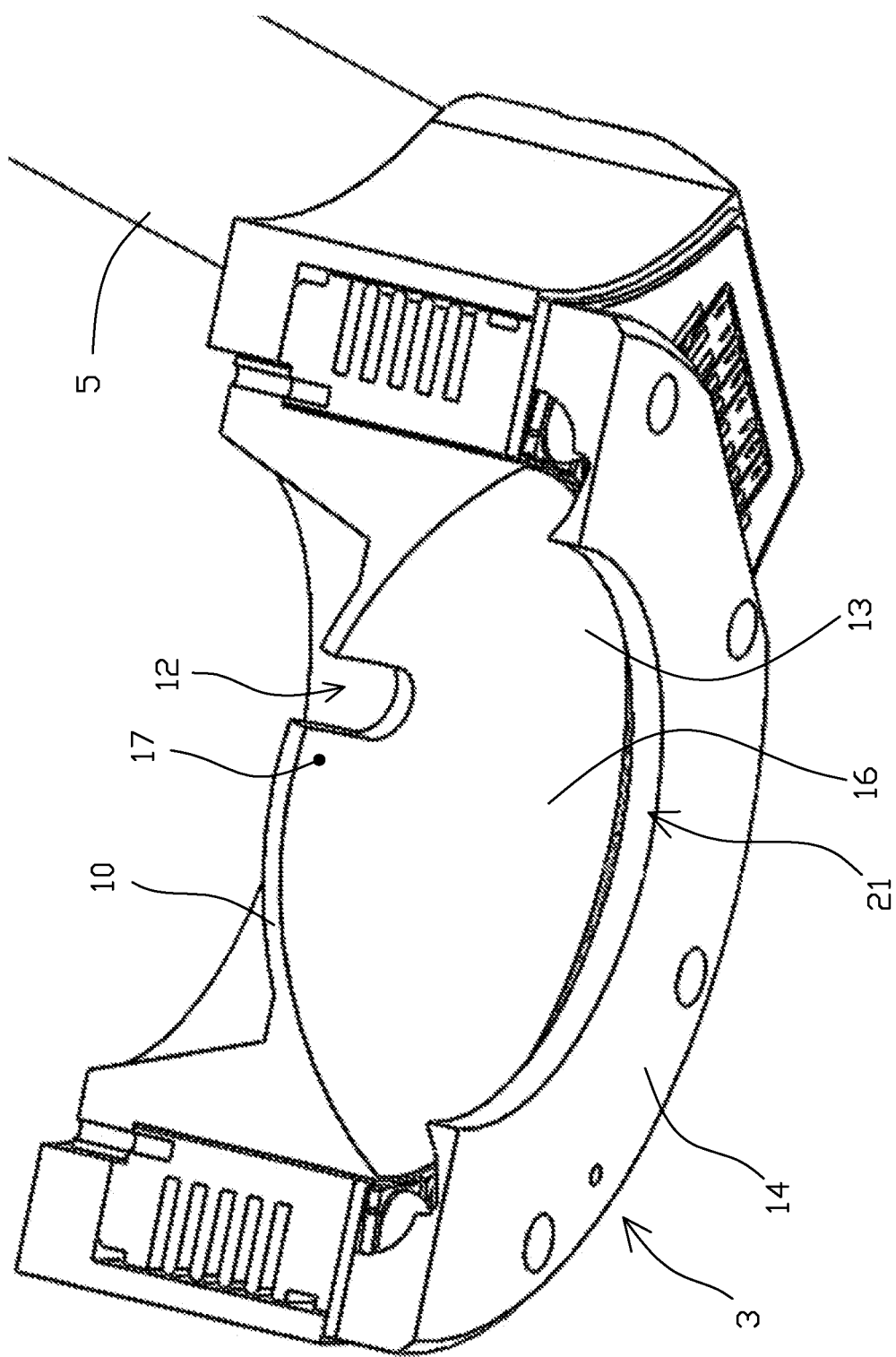
FIG. 4 is a cross-sectional view along line AA of the embodiment of FIG. 3.

FIG. 4 shows a cross-sectional view of the illumination housing 3 taken along line AA of the embodiment of FIG. 3. The view of FIG. 3 also shows the underside of the illumination housing 3. The view of FIG. 3 shows that the reflective dome 10 includes a bottom side 13. The bottom side 13 is concave. The bottom side 13 includes a diffuse highly reflective surface 16. The highly reflective surface 16 can define some or all of the bottom side 13 of the reflective dome 10. The highly reflective surface 16 can reflect essentially all light such that essentially no light is absorbed by the highly reflective surface 16. The reflective dome 10 can be formed of metal, such as aluminum, stainless steel, or other metal. The bottom side 13 of the reflective dome 10 can be coated with a matte thermal cure epoxy with a high titanium dioxide ($TiO_2$) content to achieve approximately 94% diffuse reflectance in forming the highly reflective surface 16. Additionally or alternatively, a coating of highly reflective material can be applied to the bottom side 13 of the reflective dome 10 to form the highly reflective surface 16. In such case, the reflective dome 10 itself may not be made of highly reflective material.

FIG. 4 further shows a reflector ring 14. The reflector ring 14 can partially overlap the bottom side 13 of the reflective dome 10. The reflector ring 14 includes a void 21. As shown, the void 21 is round. As will be explained further herein, light generated within the illumination housing 3 and reflected off of the highly reflective surface 16 can travel through the void 21 to reflect off of a part that is being inspected. The light reflecting off of the part can then travel through the void 21 again and through the viewport 12 to the lens 4 for reception by the camera.

The apex 17 is shown in the view of FIG. 4. The apex 17 can be the highest point of the highly reflective surface 16 and/or the center of the bottom side 13 of the reflective dome 10. The apex 17 is offset from the viewport 12. Light cannot pass through the material of the reflective dome 10 that forms the apex 17, and ideally the material of the reflective dome 10 that forms the apex 17 is highly reflective.

Figure 5:
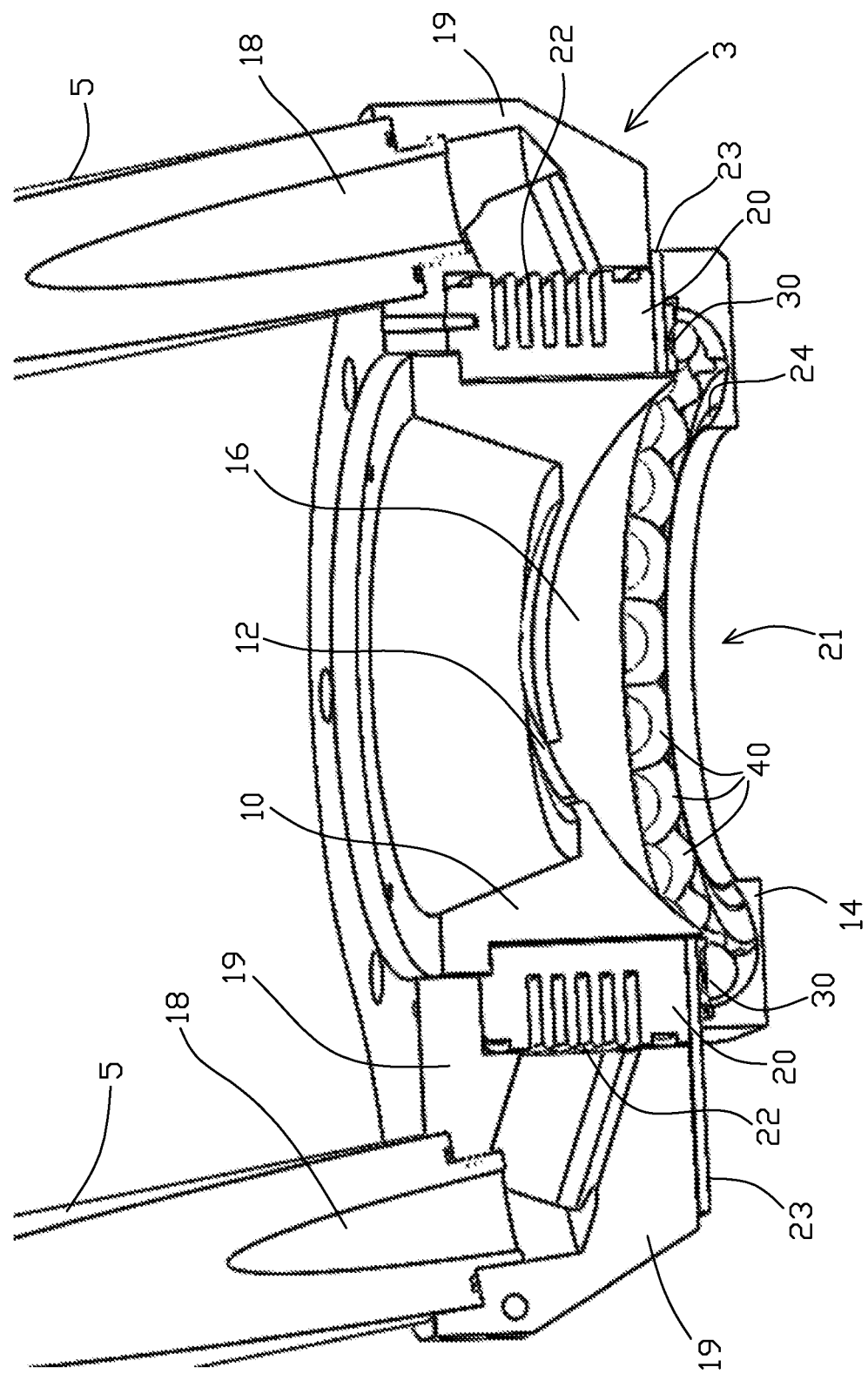
FIG. 5 is a cross-sectional view along line BB of the embodiment of FIG. 3.

FIG. 5 shows a cross-sectional view of the illumination housing 3 and the pair of tubes 5 along line BB of the embodiment of FIG. 3. Each of the pair of tubes 5 is hollow and includes a channel 18. The channels 18 can carry coolant fluid from the camera mounting structure 2 to circulate within the illumination housing 3. The illumination housing 3 further includes a base 19. The pair of tubes 5 can attach directly to the base 19, such as via a threaded interface. The channels 18 can fluidly connect with a fluid circuit 22 within the illumination housing 3. The base 19 can form a ring structure inside of which the reflective dome 10 is seated.

The illumination housing 3, according to some embodiments, further includes a heat sink 20. The heat sink 20 is formed to be a ring that extends entirely around the circumference of the reflective dome 10. The heat sink 20 can be seated within the ring structure of the base 19. The heat sink 20 includes fins which increase the surface area of the heat sink 20 to facilitate greater heat transfer. The fluid circuit 22 can be defined by an outer radial surface of the heat sink 20 and an inner surface of the base 19. The fluid circuit 22 allows coolant fluid to flow entirely around the heat sink 20 and reflective dome 10 to remove heat from the illumination housing 3 via the pair of tubes 5.

The illumination housing 3, according to some embodiments, further includes a mounting ring 23. A top side of the mounting ring 23 is in contact with, and can be attached to, the bottom side of the heat sink 20. As shown according to the embodiment illustrated in FIG. 5, the mounting ring 23 surrounds a circumference of the reflective dome 10. The mounting ring 23 defines a portion of the bottom side of the illumination housing 3. The mounting ring 23 can be a metal-core printed circuit board (MCPCB). The mounting ring 23 can include a heat-conducting base layer formed from metal, such as aluminum, copper, or other metal. The mounting ring 23 can further include a ceramic layer that separates a circuit layer (having metal conductors for providing energy to LEDs) from the heat-conducting base layer.

The mounting ring 23 supports several structures. For example, a plurality of light sources 30 are attached to a bottom side of the mounting ring 23, such as to the circuit layer. The plurality of light sources 30 are arrayed in a ring that extends entirely around the circumference of the reflective dome 10. The light sources 30 can be LEDs, for example. Blue LEDs having a wavelength between 380-460 nm may be preferred. Each LED may operate at 5 watt or greater. The plurality of light sources 30 may include sixty individual light sources, such as sixty LEDs. The faces of the light sources 30, from which the light sources emit light, are downward facing. The backsides of the light sources 30, opposite the faces, abut the mounting ring 23. Heat generated by the plurality of light sources 30 conducts through the mounting ring 23 (e.g., through the heat-conducting base layer) which in turn conducts the heat to the heat sink 20.

The reflector ring 14 can be formed from metal, such as stainless steel or aluminum. The reflector ring 14 can be mounted or otherwise attached to the mounting ring 23. The bottom side of the reflector ring 14 defines part of the bottom side of the illumination housing 3. The top side of the reflector ring 14 includes a highly reflective surface 24. The highly reflective surface 24 can be polished metal and/or a reflective coating. The highly reflective surface 24 can be specular. For example, the highly reflective surface 24 can reflect >90% of all incident light. The highly reflective surface 24 can be formed by electro-polishing (70% phosphoric, 25% sulphuric, 5% glycerin) the stainless steel of the reflector ring 14, then sputtered with a heavy copper base layer, then plated with silver, aluminum, or gold coating to increase spectral reflectivity, and a protective quartz coating. The highly reflective surface 24 can include a sputtered base copper layer, a plated copper layer, a plated or sputtered reflective metal layer, and/or a quartz protective layer. The highly reflective surface 24 reflects light emitted by the plurality of light sources 30 into the downward facing concave portion of the reflective dome 10. More specifically, the plurality of light sources 30 emit light in a downward direction, the light reflecting off of the highly reflective surface 24 of the reflector ring 14 in an upward direction where the light then reflects one or more times off of the highly reflective surface 16 of the reflective dome 10 until it exits the illumination housing 3 through the void 21 in the downward direction to illuminate a part being inspected.

The topside of the reflector ring 14 includes a plurality of scallops 40. The plurality of scallops 40 are arrayed in a ring. The radius of the ring of scallops 40 can be larger radius than the radius of the reflective dome 10. Each scallop 40 is a concave (e.g., hemispherical) depression within the reflector ring 14. The highly reflective surface 24 of the reflector ring 14 can define the plurality of scallops 40 such that each scallop 40 is highly reflective. Each scallop 40 can be positioned directly below a respective light source 30. The plurality of scallops 40 can help ensure that light emitted from the plurality of light sources 30 is directed into the reflective dome 10 and not reflected back into the light sources 30 themselves (which would otherwise generate excess heat for no illumination benefit). For example, the hemispherical shape of each scallop 40 can prevent light from traveling laterally after reflecting off of the highly reflective surface 24 of the scallop 40, wherein laterally reflected light may otherwise travel to another light source 30.

Figure 6:
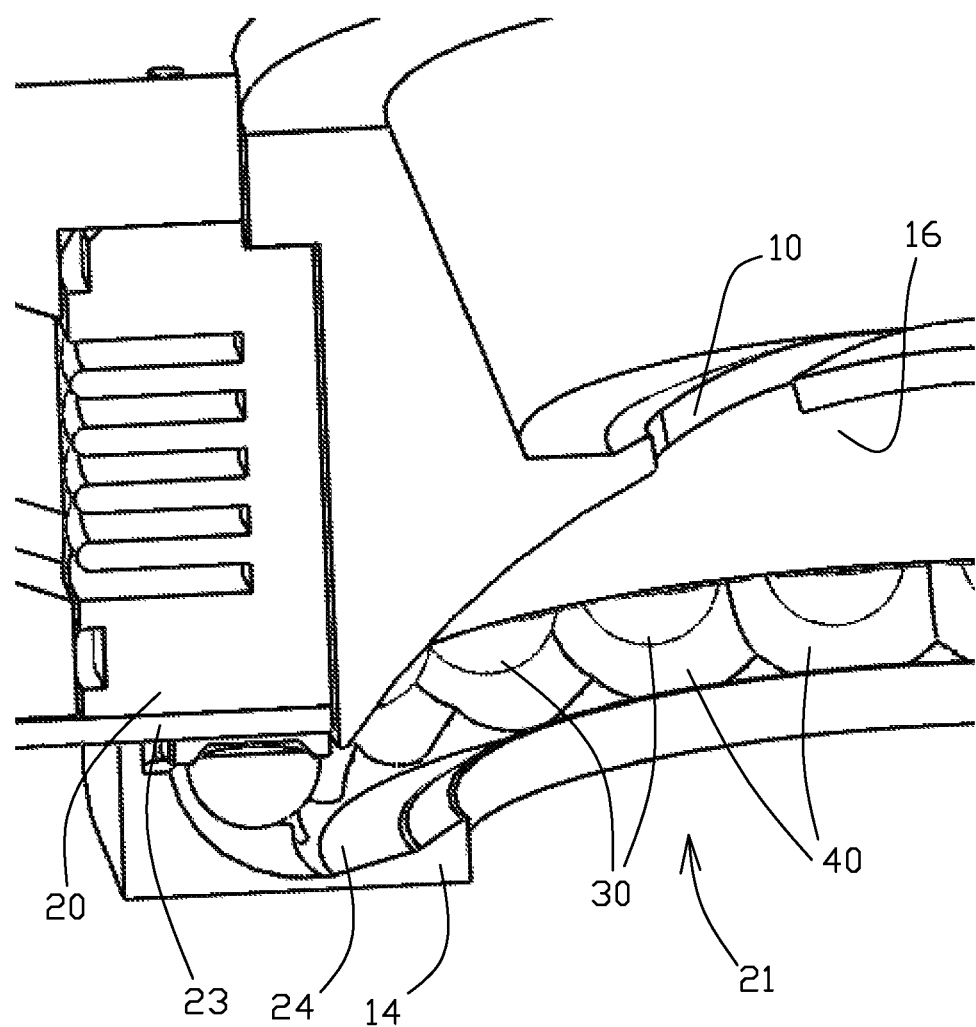
FIG. 6 is a detailed cross-sectional view along line AA of the embodiment of FIG. 3.
Figure 7:
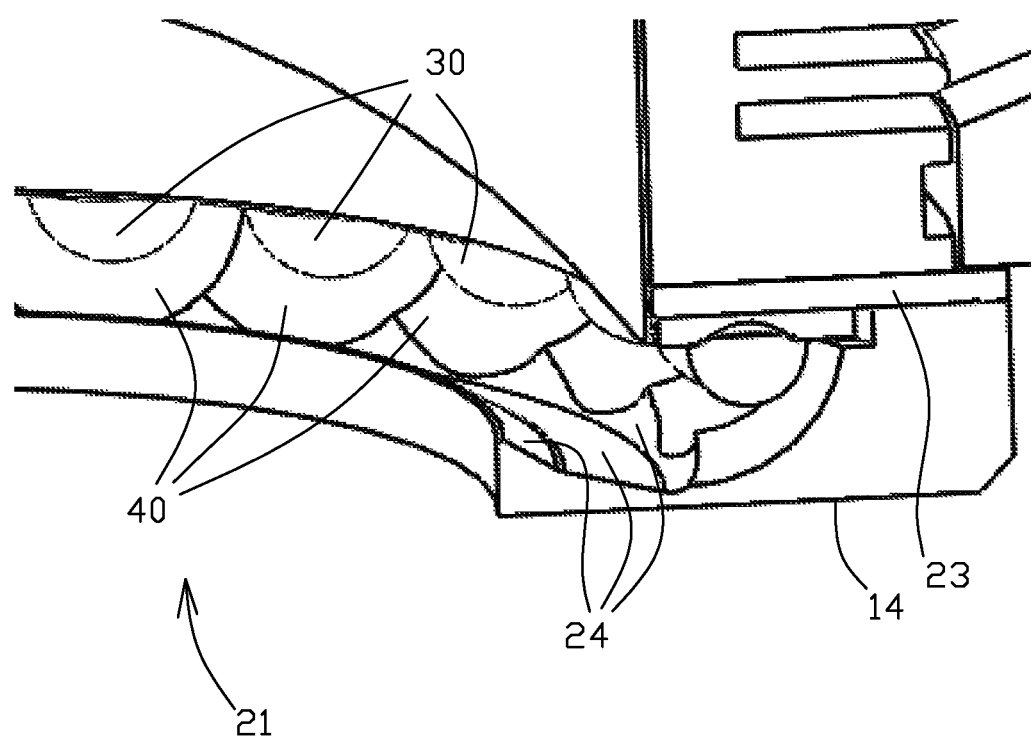
FIG. 7 is another detailed cross-sectional view along line AA of the embodiment of FIG. 3.

FIG. 6 is a detailed portion of the cross-sectional view of FIG. 5. FIG. 7 is another detailed portion of the cross-sectional view of FIG. 5. As shown, the plurality of scallops 40 are pitched inward such that their outer radial surface is higher than their inner radial surface. This pitching of each scallop 40 helps direct light toward and into the reflective dome 10.

Figure 8:
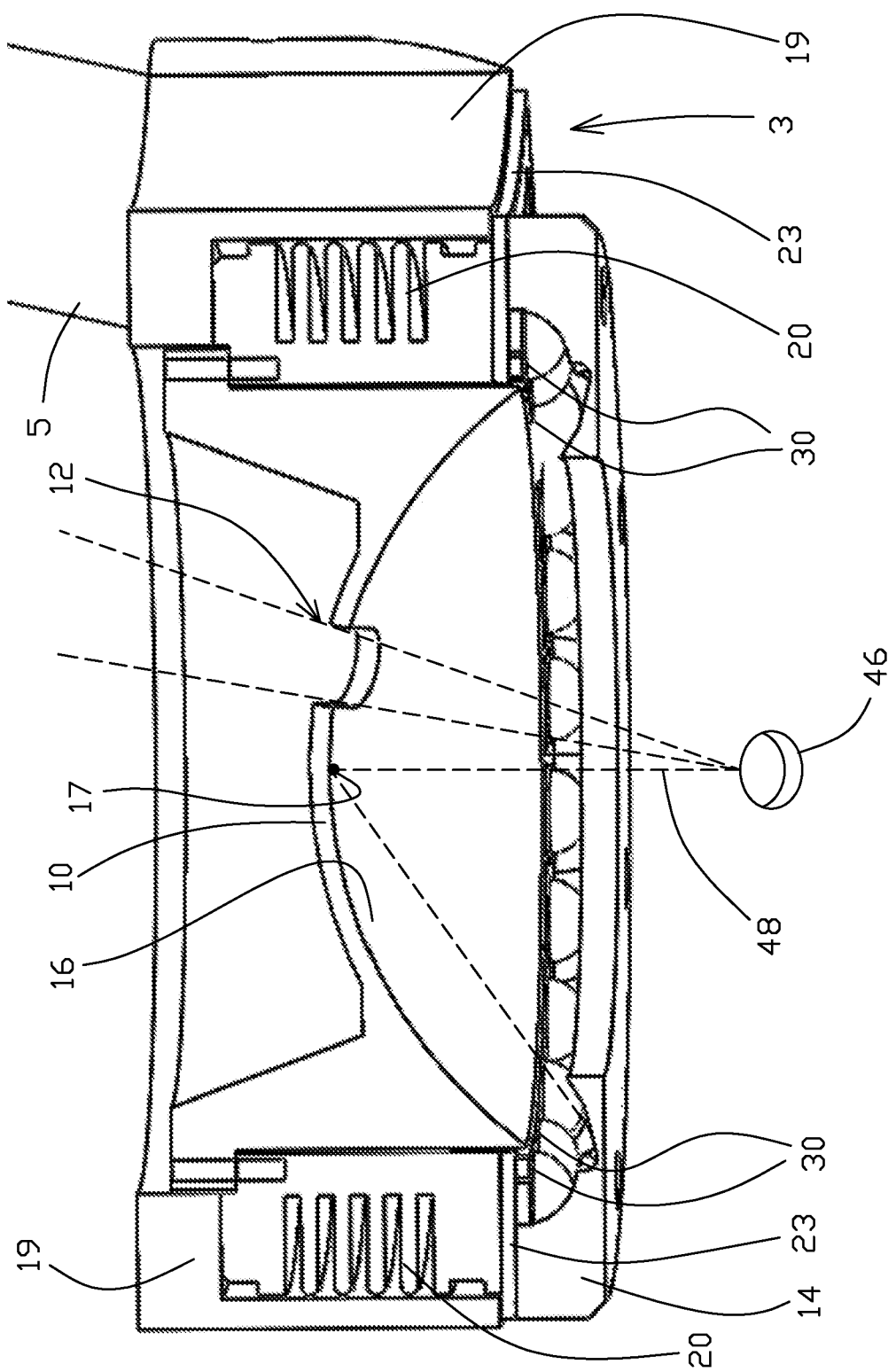
FIG. 8 is a cross-sectional view along line AA of the embodiment of FIG. 3, but from a different angle relative to the cross-sectional view of FIG. 4.

FIG. 8 is a cross-sectional view along line AA of FIG. 3. It is noted that the angle of the view of FIG. 8 is different than the angle of the view of FIG. 4. The view of FIG. 8 includes a part 46. The part 46 is spherical. A light path 48 shows light emanating from a light source 30 in a downward direction, reflecting off the reflector ring 14 and heading upward to reflect off of the highly reflective surface 16 of the reflective dome 10 to then head downward to reflect off of the part 46 where the light then heads back upward to the viewport 12 to be received by the camera. This light path 48 replicates the functionality of on-axis lighting without providing conventional on-axis illumination relative to the camera which, as discussed herein, may otherwise require a beam splitter. If the viewport 12 was at the apex 17 of the reflective dome 10, then no light reflecting orthogonal to the part 46 could be reflected through such viewport. This would create a blank spot in the image of the part 46 at the very center of the part 46, such that any nonconformity at this blank spot would not be recognized. Without the offsetting of the viewport 12, a light source would have to be provided along with use of a beam splitter to shine light both down through the hole at the apex 17 and back through the hole at the apex 17 to eliminate the blank spot. The embodiments described herein take a different approach by offsetting the viewport 12 from the apex 17. A separate light source is not required, and all the light reflecting orthogonally off of the part 46 to the camera through viewport 12 can be collected. As such, the offsetting of the viewport 12 from the apex 17 allows the ring of plurality of light sources 30 to provide diffuse illumination while approximating an image that has on-axis illumination.

Figure 9:
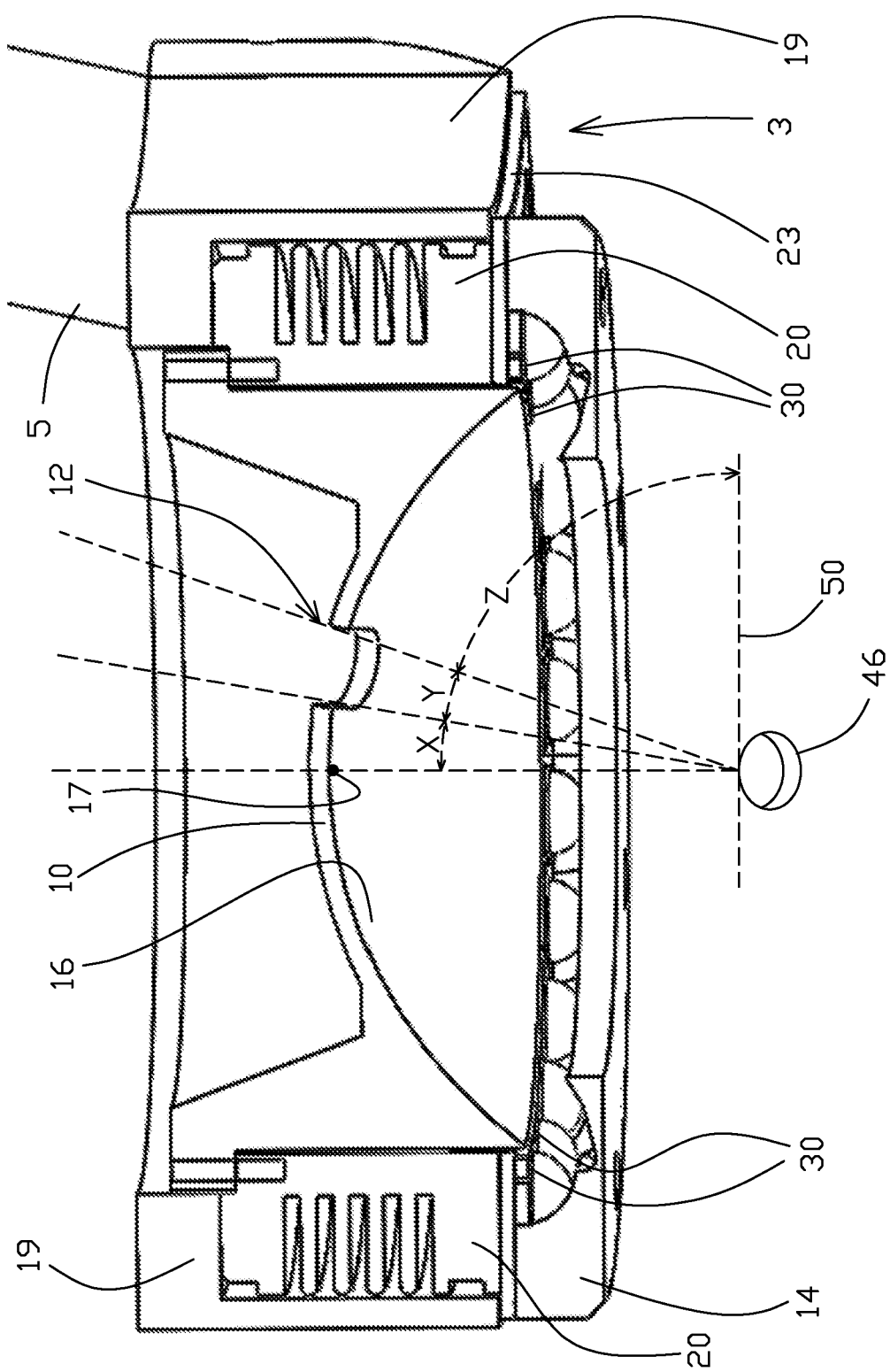
FIG. 9 is a cross-sectional view along line AA of the embodiment of FIG. 3, but from a different angle relative to the cross-sectional view of FIG. 4.

FIG. 9 illustrates the same view as in FIG. 8 but highlights the angular offsetting of the viewport 12 from the apex 17. Relative to the part 46 (the top of which can be located approximately 0.6 inches below the reflector ring 14), the viewport 12 is offset from the apex 17 by angle X. Angle X can be in the range of 2-10 degrees. Relative to the part 46, the edges of the viewport 12 have an angular window angle Y of 10-15 degrees. Relative to a bottom plane 50, which is below and parallel with respect to the reflector ring 14, the viewport 12 is offset from an intersection between the bottom plane 50 and the part 46 by angle Z. Angle Z can be in the range of zero 70-78. It will be understood that other ranges are possible.

A camera of an inspection system 1 can be a 16 k CMOS line scan camera operating at 1.6 µm pixels. A preferred application for the inspection system 1 is identifying nonconformities in flexure traces of hard disk drive head gimbal assemblies. As an example, the inspection system 1 can identify nonconformities on a 8 micrometer (µm) wide trace.

Further features and modifications of the various embodiments are further discussed herein and shown in the drawings. While multiple embodiments are disclosed, still other embodiments of the present disclosure will become apparent to those skilled in the art from the following detailed description, which shows and describes illustrative embodiments of this disclosure. Accordingly, the drawings and detailed description are to be regarded as illustrative in nature and not restrictive. Although the present invention has been described with reference to preferred embodiments, those skilled in the art will recognize that changes can be made in form and detail without departing from the spirit and scope of the invention.

What is claimed is:

1. An inspection system for providing on-axis and diffuse illumination without the use of a beam splitter, the system comprising:
   a camera; and
   a housing, the housing including:
      a reflective dome including an apex and a viewport, the viewport is offset from the apex such that light is unable to pass through the apex of the reflective dome, wherein the camera is mounted to capture light exiting the reflective dome through the viewport;

a thermally conductive mounting ring surrounding a circumference of the reflective dome and overlapping at least a portion of a bottom side of the housing; and a plurality of light sources attached to the thermally conductive mounting ring, the plurality of light sources facing away from the reflective dome such that a majority of light output from the plurality of light sources is configured to strike a first surface of the housing and the reflective dome before reflecting orthogonally off an object being inspected and exiting through the viewport into a camera.

2. The system of claim 1, wherein the light exiting the reflective dome through the viewport and received by the camera contains light that is diffuse and replicates light that is on-axis and with respect to an orientation of the camera.

3. The system of claim 1, wherein the reflective dome includes a top side and a bottom side, the bottom side including a highly reflective concave surface.

4. The system of claim 3, wherein each light source of the plurality of light sources includes a back side attached to the thermally conductive mounting ring and a face from which illumination generated by the plurality of light sources is emitted, and wherein the highly reflective concave surface and the faces of the plurality of light sources are arranged in the housing to face a downward direction.

5. The system of claim 4, wherein the first surface includes a reflector ring that overlaps the bottom side of the reflective dome, the reflector ring including a highly reflective surface that reflects a substantial amount of the light directly emitted in a downward direction from the plurality of light sources into the reflective dome, the reflector ring including a center void, wherein the light that is reflected by the reflector ring into the reflective dome reflects off of the highly reflective concave surface and through the center void to reflect off of a part being reflected and back through the center void into the reflective dome.

6. The system of claim 5, wherein the reflector ring includes a plurality of scallops arrayed around the reflector ring in a circle, the plurality of scallops including a plurality of highly reflective concave surfaces, respectively, the plurality of highly reflective concave surfaces facing an upward direction that is opposite the downward direction in which the highly reflective concave surface of the reflective dome faces.

7. The system of claim 6, wherein the plurality of scallops are located below the plurality of light sources, respectively, in a 1:1 relationship.

8. The system of claim 4, further comprising:
a heat sink within a cavity of the housing, the heat sink attached to the thermally conductive mounting ring and located between the reflective dome and an outer wall of the housing, wherein the back side of the each of the plurality of light sources transfers heat energy to the heat sink through the thermally conductive mounting ring.

9. The system of claim 8, wherein the camera is supported by a camera mounting structure, and wherein the housing is mechanically supported by only two metal tubes, the metal tubes connected to both of the camera mounting structure and the housing.

10. The system of claim 9, wherein a fluid circuit of coolant fluid runs through each of the two metal tubes and the housing.

11. The system of claim 3, wherein the viewport includes a hole having a profile that is elongated along the highly reflective concave surface of the reflective dome.

12. The system of claim 1, wherein the apex of the reflective dome is formed from reflective metal and is not transparent.

13. The system of claim 1, wherein the housing further includes a coolant fluid circuit that extends around at least part of the reflective dome, the coolant fluid circuit configured to remove heat generated by the plurality of light sources.

14. The system of claim 1, wherein the plurality of light sources are light emitting diodes.

15. An illumination housing for an inspection system for providing on-axis and diffuse illumination without the use of a beam splitter, the illumination housing comprising:
a reflective dome including an apex and a viewport, the viewport is offset from the apex such that light is unable to pass through the apex of the reflective dome;
a thermally conductive mounting ring surrounding a circumference of the reflective dome and overlapping at least a portion of a bottom side of the illumination housing; and
a plurality of light sources attached to the thermally conductive mounting ring, the plurality of light sources facing away from the reflective dome such that a majority of light output from the plurality of light sources is configured to strike a first surface of the illumination housing and the reflective dome before reflecting orthogonally off an object being inspected and exiting through the viewport into a camera.

16. The illumination housing of claim 15, wherein the illumination housing is configured such that light from the plurality of light sources exits the reflective dome through the viewport and is diffuse and replicates light that is on-axis and with respect to an orientation of a camera.

17. The illumination housing of claim 15, wherein the reflective dome includes a top side and a bottom side, the bottom side including a highly reflective concave surface.

18. The illumination housing of claim 17, wherein each light source of the plurality of light sources includes a back side attached the thermally conductive mounting ring and a face from which illumination generated by the light source is emitted, and the highly reflective concave surface and the faces of the plurality of light sources are arranged in the housing to face a downward direction.

19. The illumination housing of claim 18, wherein the first surface includes a reflector ring that overlaps the bottom side of the reflective dome, the reflector ring including a highly reflective surface that reflects a substantial amount of the light directly emitted in a downward direction from the plurality of light sources into the reflective dome, the reflector ring including a center void, wherein the light that is reflected by the reflector ring into the reflective dome reflects off of the highly reflective concave surface and through the center void to reflect off of a part being reflected and back through the center void into the reflective dome.

20. The illumination housing of claim 15, further comprising:
a heat sink within a cavity of the housing, the heat sink attached to the thermally conductive mounting ring and located between the reflective dome and an outer wall of the housing, wherein a back side of the each of the plurality of light sources transfers heat energy to the heat sink through the thermally conductive mounting ring.

* * * * *